United States Patent
Jiang et al.

(10) Patent No.: US 10,505,162 B2
(45) Date of Patent: Dec. 10, 2019

(54) BATTERY HOUSING

(71) Applicant: ANALOG DEVICES, INC., Norwood, MA (US)

(72) Inventors: Yingqi Jiang, Bedford, MA (US); Kuang Yang, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 23 days.

(21) Appl. No.: 15/726,329

(22) Filed: Oct. 5, 2017

(65) Prior Publication Data
US 2019/0109307 A1  Apr. 11, 2019

(51) Int. Cl.
| | |
|---|---|
| *H01M 2/02* | (2006.01) |
| *H01M 2/10* | (2006.01) |
| *H01M 2/16* | (2006.01) |
| *H01M 2/30* | (2006.01) |

(52) U.S. Cl.
CPC ......... *H01M 2/1027* (2013.01); *H01M 2/022* (2013.01); *H01M 2/0217* (2013.01); *H01M 2/1673* (2013.01); *H01M 2/30* (2013.01)

(58) Field of Classification Search
CPC ............ H01M 2/1027; H01M 2/0217; H01M 2/1673; H01M 2/022; H01M 2/30
See application file for complete search history.

(56) References Cited

U.S. PATENT DOCUMENTS

| | | | |
|---|---|---|---|
| 3,023,259 A | 2/1962 | Coler et al. | |
| 5,244,754 A * | 9/1993 | Bohmer ............ | H01M 2/1055 429/91 |
| 5,415,949 A | 5/1995 | Stone et al. | |

(Continued)

FOREIGN PATENT DOCUMENTS

| | | |
|---|---|---|
| CN | 201966261 U | 9/2011 |
| KR | 10-2015-0016897 | 2/2015 |

(Continued)

OTHER PUBLICATIONS

Gaikwad et al., "Highly Flexible, Printed Alkaline Batteries Based on Mesh-Embedded Electrodes," Advanced Materials, 2011 in 5 pages.

(Continued)

*Primary Examiner* — Cynthia K Walls
(74) *Attorney, Agent, or Firm* — Knobbe, Martens, Olson & Bear, LLP

(57) ABSTRACT

A battery housing can include a first chamber configured to receive a first electrode material, the first chamber bounded at least in part by a first inflatable casing. The battery housing can include a second chamber configured to receive a second electrode material, the second chamber bounded at least in part by a second inflatable casing. An ionically conductive partition can be disposed between the first and second chambers. A first electrical contact can be coupled to or formed with the first inflatable casing. A second electrical contact can be coupled to or formed with the second inflatable casing. The first inflatable casing can be configured to inflate in response to an injection of the first electrode material into the first chamber. The second inflatable casing can be configured to inflate in response to an injection of the second electrode material into the second chamber.

20 Claims, 7 Drawing Sheets

(56) References Cited

U.S. PATENT DOCUMENTS

| | | | |
|---|---|---|---|
| 5,439,758 A | 8/1995 | Stone et al. | |
| 5,650,241 A | 7/1997 | McGee | |
| 6,967,362 B2 | 11/2005 | Nam et al. | |
| 7,624,499 B2 | 12/2009 | Stole | |
| 8,361,644 B2 | 1/2013 | Kane et al. | |
| 9,601,278 B2 | 3/2017 | Jiang et al. | |
| 2012/0276434 A1 | 11/2012 | Gaikwad et al. | |
| 2013/0309536 A1* | 11/2013 | Wu | H01M 2/0217 429/99 |
| 2016/0064149 A1 | 3/2016 | Jiang et al. | |
| 2016/0104581 A1 | 4/2016 | Jiang et al. | |
| 2016/0111705 A1 | 4/2016 | Kisdarjono et al. | |
| 2016/0204492 A1 | 7/2016 | Jiang et al. | |
| 2016/0226542 A1 | 8/2016 | Tran et al. | |
| 2016/0322611 A1 | 11/2016 | Kang et al. | |
| 2017/0005504 A1 | 1/2017 | Rho et al. | |
| 2017/0222254 A1 | 8/2017 | Sakamoto et al. | |

FOREIGN PATENT DOCUMENTS

| | | |
|---|---|---|
| KR | 10-2016-0032992 | 3/2016 |
| KR | 10-2016-0048689 | 5/2016 |
| KR | 10-2016-0052426 | 5/2016 |
| WO | WO 2013/136181 | 9/2013 |
| WO | WO 2016/204050 | 12/2016 |

OTHER PUBLICATIONS

Kwon et al., "Cable-Type Flexible Lithium Ion Battery Based on Hollow Multi-Helix Electrodes" Advanced Materials, Jul. 2012 in 6 pages.

Pushparaj et al., "Flexible Energy Storage Devices Based on Nanocomposite Paper," PNAS, vol. 104, No. 34, dated Aug. 21, 2007, pp. 13574-13577.

Xu, et al., "Stretchable Batteries with Self-Similar Serpentine Interconnects and Integrated Wireless Recharging Systems," Nature Communications, 2013 in 36 pages.

Zhou et al., "Progress in Flexible Lithium Batteries and Future Prospects," Energy & Environmental Science, 2014, 7, pp. 1307-1338.

* cited by examiner

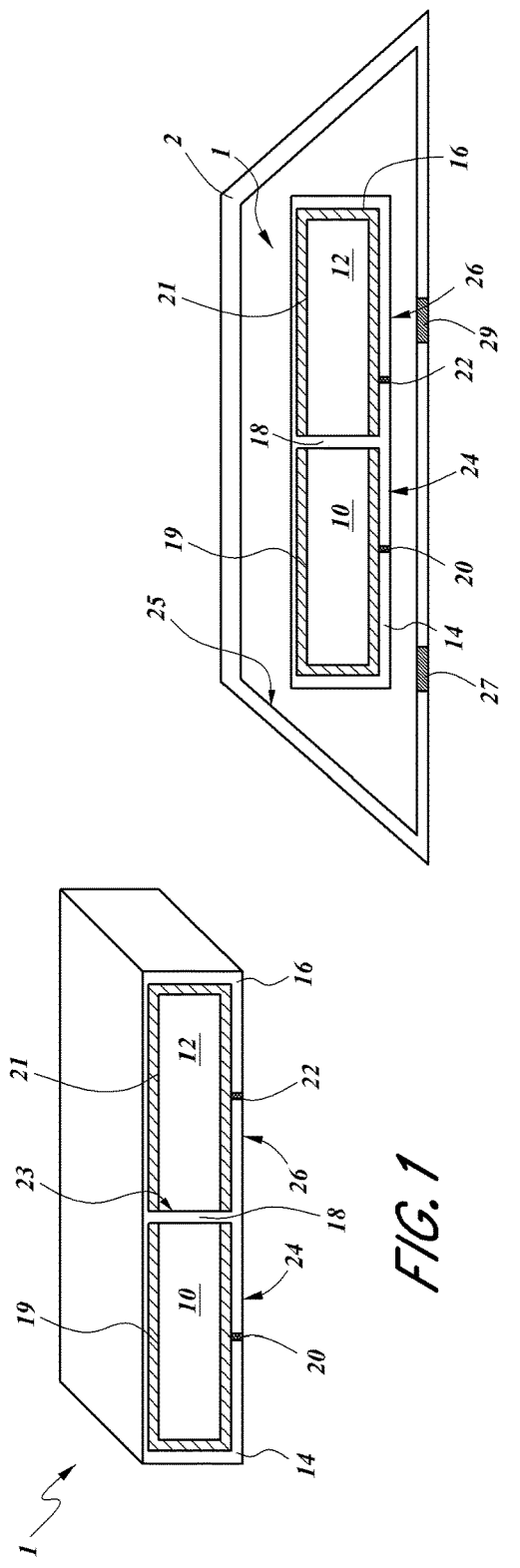
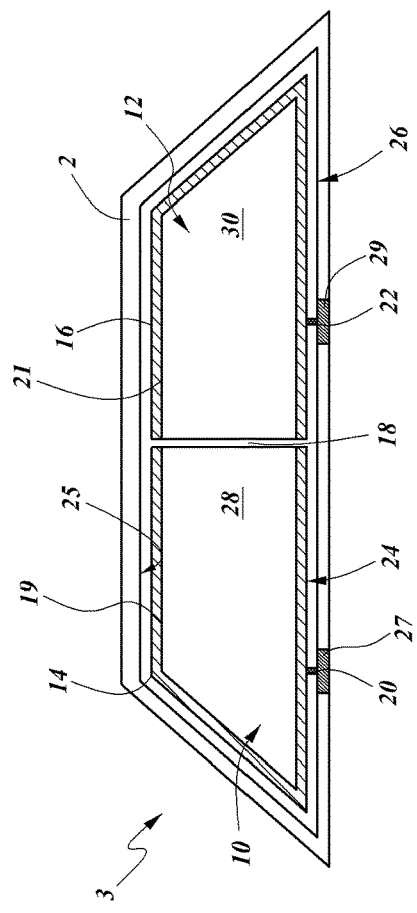

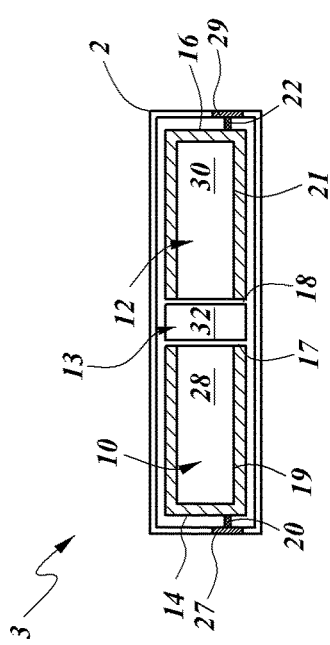
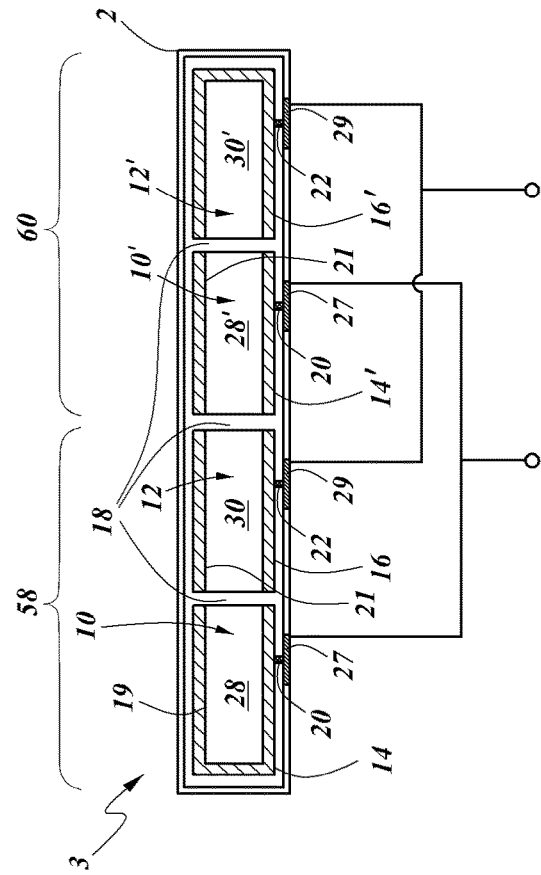

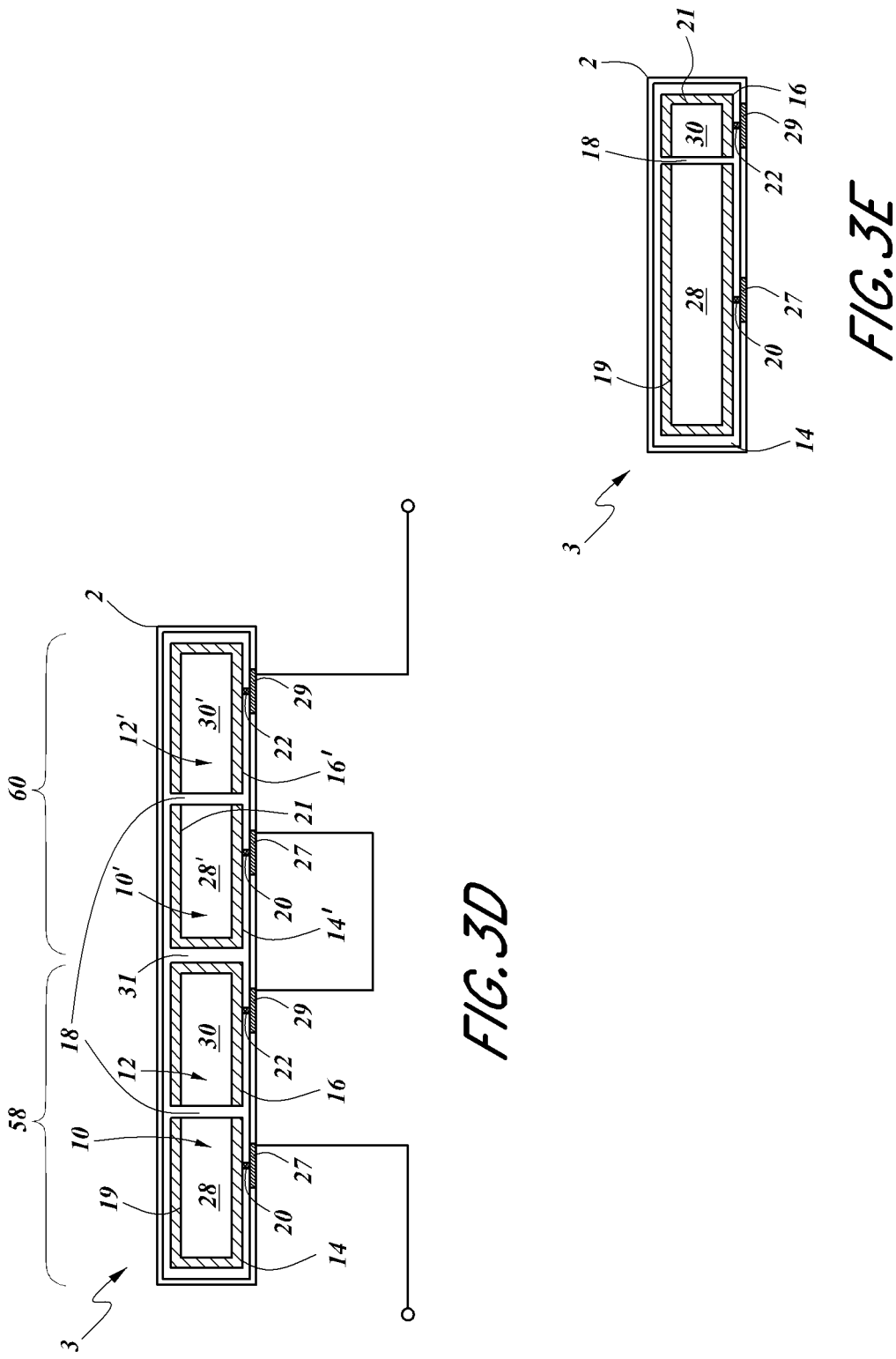

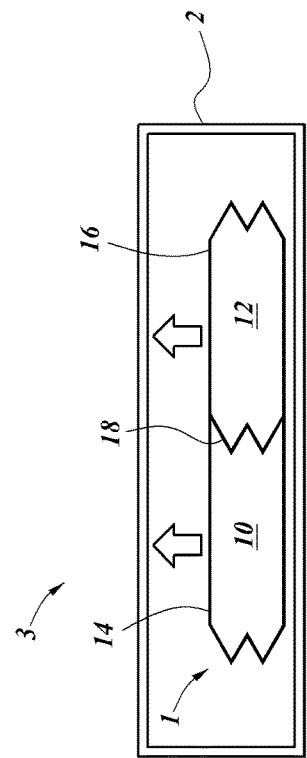
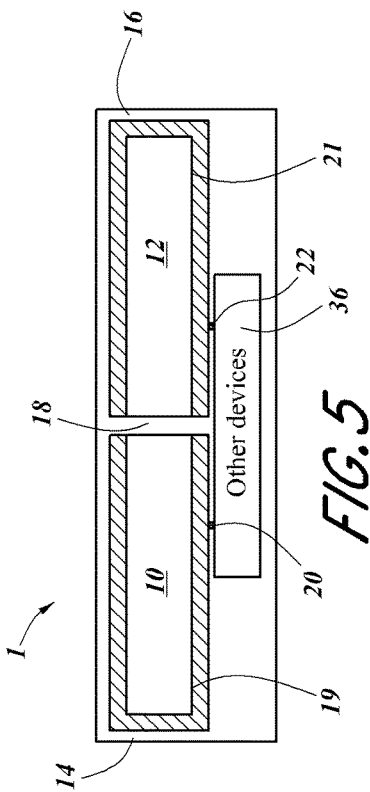
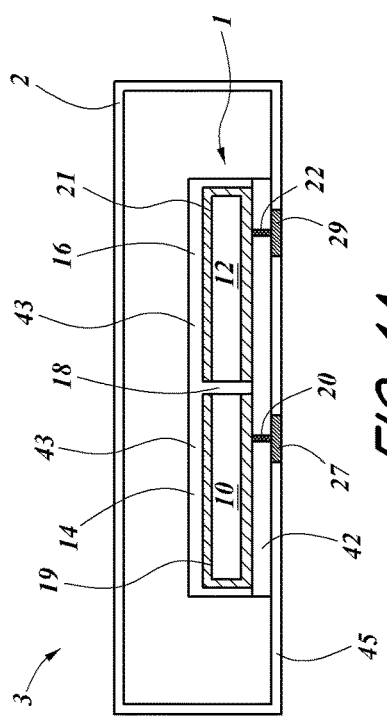
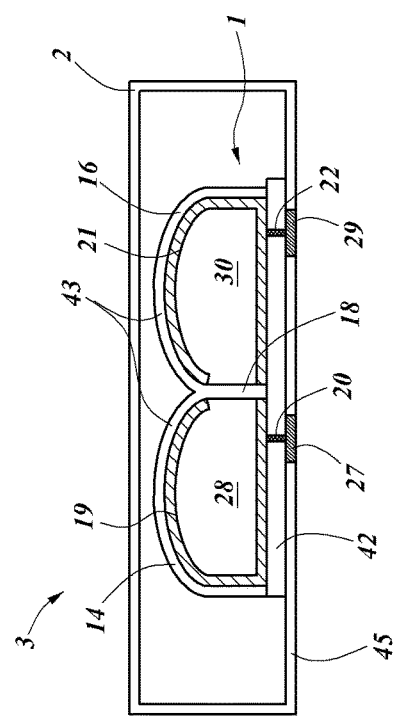

BATTERY HOUSING

BACKGROUND

Field

The field relates to battery housings, and in particular, to inflatable battery housings.

Description of the Related Art

Most batteries used today, such as lithium ion batteries, are manufactured with a laminate form factor and have hard shell casings that fix the shapes of the batteries. Conventional batteries are also manufactured independent from the shapes and sizes of the devices that use the batteries. Thus, designing a device can depend at least in part on conventional battery shapes and can limit the overall shape and size of the device. Accordingly, there is a continuing need for improved batteries and battery housings.

SUMMARY

In one aspect, a battery housing is disclosed. The battery housing can include a first chamber configured to receive a first electrode material. The first chamber is bounded at least in part by a first inflatable casing. The battery housing can also include a second chamber configured to receive a second electrode material. The second chamber is bounded at least in part by a second casing. An ionically conductive partition is disposed between the first and second chambers. A first electrical contact can be coupled to or formed with the first inflatable casing and the first electrical contact is extending through a first wall of the first inflatable casing. A second electrical contact can be coupled to or formed with the second casing and the second electrical contact is extending through a second wall of the second casing. The first inflatable casing is configured to inflate in response to an injection of the first electrode material into the first chamber.

In another aspect, a method for manufacturing a battery that includes a first chamber, a second chamber and an ionically conductive partition that is disposed between the first and second chambers is disclosed. The method can include a step disposing a first electrode material into the first chamber to inflate the first chamber. The method can also include another step disposing a second electrode material into the second.

In another aspect, a battery assembly is disclosed. The battery assembly can include an outer casing and a battery disposed in the outer casing. The battery can include a battery housing that comprises a first chamber and a second chamber separated by an ionically conductive partition. The first chamber can be bounded at least in part by a first inflated casing and the second chamber can be bounded at least in part by a second casing. A first electrode material is disposed in the first chamber and a second electrode material is disposed in the second chamber. A size and a shape of the first chamber is defined at least in part by a corresponding size and shape of the outer casing.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific implementations of the invention will now be described with reference to the following drawings, which are provided by way of example, and not limitation.

FIG. 1 is a schematic isometric view of a cross-sectioned battery housing having a first chamber, a second chamber, and an ionically conductive partition, according to one embodiment.

FIG. 2 is a cross sectional side view of the battery housing shown in FIG. 1 disposed within an outer casing.

FIG. 3A is a cross sectional side view of a battery assembly having the outer casing and first and second inner casings of FIG. 2, after inflating the first and second inner casings with respective first and second electrode materials.

FIG. 3B is a cross sectional side view of the battery assembly including a third chamber configured to receive an electrolyte material, according to another embodiment.

FIG. 3C is another cross sectional side view of the battery assembly with a plurality of first chambers and a plurality of second chambers connected in parallel, according to another embodiment.

FIG. 3D is another cross sectional side view of the battery assembly with a plurality of first chamber and a plurality of second chambers connected in series, according to another embodiment.

FIG. 3E is a cross sectional side view of the battery assembly having differently sized first and second casings, according to another embodiment.

FIG. 4A is a cross sectional side view of the battery housing having inflatable portions and rigid portions and the outer casing before the first and second electrode materials are disposed into the first and second casings of the battery housing, according to another embodiment.

FIG. 4B is a cross sectional side view of the battery housing and the outer casing of FIG. 4A after the first and second electrode materials are disposed into the first and second casings of the battery housing.

FIG. 4C is a cross sectional side view of the battery housing having a bellow like shape and the outer casing before the first and second electrode materials are disposed into the first and second casings of the battery housing, according to another embodiment.

FIG. 5 is a cross sectional side view of an embodiment of the battery housing and the outer casing having one or more electronic devices integrated therein, according to another embodiment.

DETAILED DESCRIPTION OF THE PREFERRED EMBODIMENT

Figure 6:
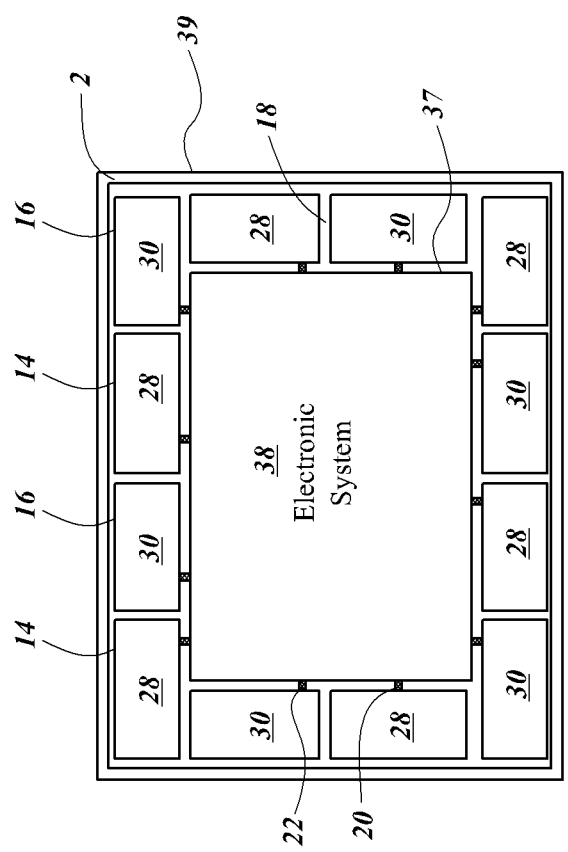
FIG. 6 is a cross sectional side view of an embodiment of the battery housing and the outer casing disposed about a periphery of an electronic system, according to various embodiments.

Batteries are important power sources for many electrical or electronic devices used in everyday life today. For example, among other things, watches, wireless devices (including, e.g., mobile smartphones, tablet computing devices, etc.), remote control devices, and wearable health products (e.g., hearing aids, biometric sensors such as vital sign monitoring devices, etc.) use batteries to supply power to the electrical and/or electronic components within the devices. With the miniaturization of electronic devices, there is a strong demand for batteries that can improve the use of space in electronic devices. Embodiments of the present disclosure can beneficially provide batteries for such electronic devices, and in particular, batteries that can conform to arbitrarily-sized and shaped spaces within the device. Various embodiments can also provide smaller batteries for small form-factor devices.

Widely used types of batteries have rigid or firm shells and may not fit into irregular and/or variable spaces, such as thin spaces with curvatures and/or spaces with zigzag peripheries. Therefore, a space or compartment in a device for installing such batteries often need to be reserved independent from the electronic components in the device which may affect the overall design (including the overall size and/or shape) of the device. Also, sizes of the widely used types of batteries are defined and may not be varied. Therefore, such batteries can cause a waste of space in irregular spaces that are not specifically made for receiving the batteries. In some embodiments of the present disclosure, batteries that can be installed in irregular spaces irregular for receiving the widely used types of batteries are introduced. In such embodiments, the battery can include a battery housing having a plurality of casings that are configured to receive electrode materials and an ionically conductive partition between respective casings. The battery housing can be positioned into an irregular space, whereby electrode materials (e.g., anode and cathode materials) can be injected into the casings, inflating the casings until the casings form desired shapes and/or sizes. The desired shapes and/or sizes can be defined, in whole or in part, by an outer casing of the electronic device. Outer boundaries of the casing can be defined by the irregular space partly and/or entirely. Hence, the battery can use the irregular space effectively.

FIG. 1 is a schematic isometric view of a cross section of a battery housing 1 having a first chamber 10, a second chamber 12, and an ionically conductive partition 18 provided in at least a portion of a wall 23 separating the first and second chambers 10, 12. In some embodiments, the ionically conductive partition 18 can comprise the entire wall 23; in other embodiments, the ionically conductive partition 18 can comprise only a portion of the wall 23, and the remaining portion may be ionically non-conductive. The first and second chambers 10, 12 can be bounded at least in part by a first casing 14 and a second casing 16. In the illustrated embodiment, the first and second casings 14, 16 comprise elastic materials that can inflate or expand upon filling with fluidly provided battery electrode materials, similar to a balloon and/or a sausage casing. However, it should be understood that, in some embodiments, only one of the casings 14, 16 can be inflated or expanded. The ionically conductive partition 18 can be disposed between the first and second chambers 10, 12. The first casing 14 can have a first electrical contact 20 on a first wall 24, and the second casing 16 can have a second electrical contact 22 on a second wall 26. The first casing 14 and the second casing 16 can also include first and second current collectors 19, 21 along inner peripheries of the first and second casings 14, 16. The first electrical contact 20 is electrically connected with the first current collector 19 and the second electrical contact 22 is electrically connected with the second current collector 21. The current collectors 19, 22 can collect current in the battery electrode materials.

FIG. 2 is a cross sectional side view of the battery housing 1 shown in FIG. 1 disposed within an outer casing 2. In some embodiments, the outer casing 2 can comprise a cavity defined within an electronic device that is to be powered by the battery. For example, the electronic device can comprise a watch, a smartphone, a tablet computing device, a remote control device, a medical device (such as a hearing aid), and/or any other type of electronic device. The outer casing 2 shown here is enclosed, but the outer casing may have an open portion(s) in various embodiments. The outer casing 2 as shown in FIG. 2 has a quadrilateral (e.g., trapezoidal) shape. However, the outer casing 2 can have any suitable shape including an irregular, variable, and/or small space, such as a thin spacing with curvatures and/or a small space with zigzag peripheries. Beneficially, the electronic device can be designed to have any form factor desired by the designer, and the outer casing 2 of the electronic device can have any suitable size and/or shape, provided that the outer casing 2 accommodates sufficient volume for the electrode materials of the battery.

FIG. 3A is a cross sectional side view of a battery assembly 3 having the outer casing 2 and first and second casings 14, 16 of FIG. 2, after inflating the first and second casings 14, 16 with first and second electrode materials 28, 30, respectively. Since the casings 14, 16 of FIG. 3A are inflated relative to the casings 14, 16 of FIG. 2, the casings 14, 16 as depicted in FIG. 3A may also be referred to herein as a first inflated inner casing 14 and a second inflated inner casing 16. The first inflated casing 14 and the second inflated casing 16 are generally similar to the first and second casings of FIG. 1, except in FIG. 3A, a first electrode material 28 and a second electrode material 30 are disposed in the first and second inflated casings 14, 16 respectively, such that the casings 14, 16 are expanded relative to their unfilled states. For example, in various embodiments, the first and second electrode materials 28, 30 can be injected through respective injection ports (not shown) provided through the casings 14, 16. Therefore, the battery housing 1 of FIGS. 1 and 2 can also be characterized as a pre-inflated or uninflated housing, and the battery housing 1 of FIG. 3A can be characterized as a post-inflation or inflated housing.

As shown in FIG. 3A an outer boundary of the first and second inflated inner casings 14, 16 can be defined by the outer casing 2 such that the first and second electrode materials 28, 30 cause the inner casings 14, 16 to expand and generally conform to an inner surface 25 of the outer casing 2. In some embodiments, the outer casing 2 can fully define the shape of the inflated casings 14, 16, such that the inner inflated casings 14, 16 conform to substantially the entirety of the inner surface 25 of the outer casing 2. In other embodiments, however, the first and/or second inflated casings 14, 16 may not fully conform to the inner surface 25 of the outer casing 2, such that the outer boundary can be only partly defined by the outer casing 2 or self-regulating (e.g., not dependent on the shape of the outer casing 2). In a case of the embodiment where the casings 14, 16 are fully and/or partly conformed to the inner surface 25, the casings are more deformable than the casings 14, 16 for an embodiment where they are self-regulating. Therefore, in some embodiments, the self-regulating casings 14, 16 can have uneven flexibility and/or inflatability around the casings 14, 16 for forming desired shape after injecting the electrode materials 28, 30.

In some embodiments, the inflatable casings 14, 16 (or pre-inflation casings) can have a predetermined structure to be suitable for forming a particular shape of the outer casing 2. For example, the bottom right and bottom left corners of the casings 14, 16 as shown in FIG. 1 can be designed to have more inflatable, stretchable, and/or flexible properties for conforming to the shape of the outer casing 2 shown in FIG. 3A.

In some embodiments, the current collectors 19, 21 can be formed on the inner peripheries of the casings 14, 16. In some embodiments, the current collectors 19, 21 can be traces embedded on the inner surface of the casings 14, 16. The current collectors 19, 21 illustrated in the figures, for example FIGS. 1-3D, are formed on three sides of the casings 14, 16. However, the current collectors 19, 21 can be disposed anywhere in the casings 14, 16 in any shape suitable for collecting current in the electrode materials 28, 30. For example, the current collectors 19, 21 can be formed on six (all) sides of the casings 14, 16 and/or middle of the casings 14, 16. An efficiency of collecting current can be affected by an area of the current collectors 19, 21 that abut the electrode materials 28, 30. In some embodiments, the first and/or second current collectors 19, 21 can have a plurality of bends and/or curves to be stretchable. For example, to increase surface area and maximize contact with the electrode materials 28, 30, the collectors 19, 21 can include elongate elements in patterns, such as spirals, that can expand with the casings 14, 16 without breaking. The first and second current collectors 19, 21 can comprise copper, gold, aluminum and/or any other suitable conductive material for collecting current in the electrode materials 28, 30. For example, in an embodiment where the first electrode material 28 is an anode material and the second electrode material 30 is a cathode material, the first current collector 19 can comprise copper and the second current collector 21 can comprise aluminum.

The first electrode material 28 can comprise an anode material (e.g., graphite and silicon) and the second electrode material 30 can comprise a cathode material (e.g., Lithium Nickel Cobalt Aluminum Oxide (NCA), Lithium Manganese Oxide (LMO), Lithium Iron Phosphate (LFP), Lithium Cobalt Oxide (LCO), Lithium Nickel Manganese Cobalt Oxide (NMC), etc.). The electrode materials 28, 30 can also include additives, such as carbon black, carbon nanotubes and/or graphene to increase the electrical conductivity. It should be understood that the first electrode material 28 can be the cathode material and the second electrode material 30 can be the anode material in alternative embodiments. In some embodiments, the first and second electrode materials 28, 30 can be disposed into the first and second chambers 10, 12 by way of injection through an injection needle. In such embodiments, the casings 14, 16 can be made of materials that can seal and/or close a hole created by the needle after withdrawal of the needle without any further sealing or closing process. Alternatively, the casings 14, 16 can include nipples for the needle to access inside of the casings 14, 16. In some other embodiments, portions of the casings 14, 16 can be opened to be accessible for disposing the first and second electrode materials 28, 30 and the open portions can be sealed by a sealing process. The sealing process can be, for example, bonding the open portions, disposing covers at the open portions, etc. The first and second electrode materials 28, 30 can initially be in a liquid, gel, and/or powder form when being injected into the first and second chambers 10, 12. After injection, the first and second electrode materials 28, 30 can remain in the same form as they were injected and/or altered to a different form (e.g., cured from a liquid form to a solid form).

The ionically conductive partition 18 can comprise any suitable type of ionically conductive material, such as Carboxymethylcellulose (CMC) with Styrene Butadiene Rubber (SBR), Polyvinylidene Fluoride (PVDF), and/or any other ionically conductive materials. In some embodiments, the ionically conductive partition 18 can have a porous configuration that has pores allowing ions to pass through. In some embodiments, the partition 18 can be inflatable, stretchable, flexible, and/or bendable. In some embodiments, the partition 18 is not elastic. In other embodiments, the partition 18 can include separate flexible materials and ionically conductive materials. For example, a grid of elastic materials can expand with inflation of the casings 14, 16, while windows of less flexible or inelastic materials can serve as ionic conductors within the grid. The partition 18 can serve as an electrolyte between the first and second electrode materials 28, 30, e.g., the partition 18 can promote the movement of ions between the cathode and anode to generate current for powering the electronic device.

In some embodiments, the first and second casings 14, 16 can be entirely or partially inflatable, stretchable, flexible, and/or bendable. In some embodiments, the first and second casings 14, 16 can be more inflatable stretchable, flexible, and/or bendable than the ionically conductive partition 18. In some embodiments, only one of the first and second casings 14, 16 can be entirely or partially inflatable, stretchable, flexible, and/or bendable, and the other of the first and second casings 14, 16 may not be inflatable. Thus, in some embodiments, both casings 14, 16 can be inflated with a flowable electrode material. In other embodiments, however, one casing 14 or 16 can be inflated with the flowable electrode material, and the other casing 14 or 16 can comprise a solid or otherwise non-flowable electrode material. Some examples of materials that can be used for forming the first and second casings 14, 16 are polyimide, polychlorotrifluoroethylene (PCTFE), and/or any other non-conductive material. The first and second casings 14, 16, prior to inflation as depicted in FIG. 1, can have a cuboid- or parallelepipedlike shape. However, prior to inflation, the first and second casings 14, 16 can have any suitable defined shape (e.g., a spherical shape, a cubic shape, a cylindrical shape) and/or an undefined or crumpled shape (similar to a crumpled plastic bag). In some embodiments, after inflation, the first and/or second casings 14, 16 can remain entirely or partially inflatable, stretchable, flexible, and/or bendable. In such embodiments, the first and/or second casings 14, 16 can be deformed in response to a volume change of the electrode materials 28, 30 during battery charge/discharge. Such embodiments can be especially beneficial when silicon is used as the anode material because, in such situation, an anode volume can be expanded up to four times in some embodiments compared to its original size. Thus, the casings 14, 16 can reduce the risks of damage. However, in some other embodiments, the first and/or second casings 14, 16 can become stiff or stiffer after inflation than prior to inflation.

The first electrical contact 20 can be coupled to or formed with the first current collector 19 of the first casing 14. The first electrical contact 20 can extend through the first wall 24. Similarly, the second electrical contact 22 can be coupled to or formed with the second current collector 21 of the second casing 16. The second electrical contact 22 can extend through the first wall 24. The first and second electrical contacts 20, 22 can conduct electrons to and/or from the first and second electrode materials 28, 30, respectively, to power the electronic components of the electronic device. For example, after inflation of the inner casings 14, 16, the first and second electrical contacts 20, 22 can make electrical contact with corresponding first and second current collectors 19, 21 and corresponding first and second electrical terminals 27, 29 of the outer casing 2. Thus, the first and second electrical terminals 27, 29 can provide electrical communication between the components of the electronic device and the first and second electrode materials 28, 30 by way of the intervening contacts 20, 22. In some embodiments, the first and second electrical terminals 27, 29 can be traces embedded on the outer casing 2. In some embodiments, the first and second electrical contacts 20, 22 can be electrically connected with corresponding first and second electrical terminals 27, 29 by way of solder balls, wires, printed circuit board (PCB), flexible substrates or connections, etc. In some other embodiments, locations of the first and second electrical contacts 20, 22 and corresponding first and second electrical terminals 27, 29 can be designed such that after inflation of the chambers 14, 16, the first and second electrical contacts 20, 22 and corresponding first and second electrical terminals 27, 29 make contacts without an intervening conductive material.

The first and second electrical contacts 20, 22 can be made of the same or different materials from the first and second current collectors 19, 21. For Example, the first and second electrical contacts 20, 22 can comprise copper, gold, aluminum and/or any other suitable conductive material. In the illustrated embodiment, the contacts 20, 22 may comprise relatively small or discrete shapes, but in other embodiments, the contacts 20, 22 may be larger. In some embodiments, the first electrical contact 20 can comprise a plurality of electrical contact lines, e.g., which may be formed in a gridlike pattern. The contacts 20, 22 can be formed through the walls 24, 26 of the housing 1 between stretchable portions of the casings 14, 16. In some other embodiments, the first and second electrical contacts 20, 22 can form any suitable shape for conducting free electrons. In some embodiments, the first and/or second electrical contacts 20, 22 can have a plurality of bends and/or curves to be stretchable. For example, to increase surface area and maximize contact with contacts on the outer casing 2, the contacts 20, 22 can include elongate elements in patterns, such as spirals, that can expand with the casings 14, 16 without breaking. In addition, the walls 24, 26 shown in FIG. 1 is illustrated as being on the bottom side of the casings 14, 16 but in various embodiments, the walls 24, 26 and contacts 20, 22 may be on any side of the casings 14, 16, and can be positioned to move into contact with corresponding contacts of the outer casing 2 upon inflation of the casings 14, 16 with electrode materials.

In some embodiments, the first casing 14 and/or the second casing 16 can have respective inlets or injection ports for receiving the first electrode material 28. In some other embodiments, the casings 14, 16 can have respective openings which can be sealed after injecting the first and second electrode materials 28, 30 into the first and second chambers 10, 12, respectively, similar to nipples employed for inflation of various balls. In some embodiments, the second casing 16 can have the similar configurations and/or properties as the first casing 14 or the second casing 16 can have different configurations. For example, the first and second casings 14, 16 can have different shapes/sizes, materials, and/or inflatability.

FIGS. 3B-3E are cross sectional side views of different embodiments of a battery assembly 3. Unless otherwise noted, the components of FIG. 3B may be the same as or generally similar to like-numbered components of FIGS. 1-3A. As with the embodiment of FIGS. 1-3A, the embodiments of FIGS. 3B-3E have the outer casing 2, first chamber 10 with first electrode material 28, and second chamber 12 with second electrode material 30 generally similar to those explained with reference to FIG. 3A. As with FIG. 3A, the first and second electrode materials 28, 30 can be injected or otherwise provided inside the chambers 10, 12 to cause the first inner casing 14 and the second inner casing 16 to inflate to generally or partially conform to the inner surface 25 of the outer casing 2.

In FIG. 3B, the battery assembly 3 can further include a third chamber 13 configured to receive an electrolyte material 32. As shown in FIG. 3B, the third chamber 13 can be defined at least in part by a third casing 17 provided between the first and second casings 14, 16 (and between the first and second chambers 10, 12). The electrolyte material 32 may be in a solid form, a liquid form and/or any other suitable forms. As with the first and second electrode materials 28, 30, the electrolyte material 32 may beneficially be injected into the third chamber 13 to cause the third casing 17 to inflate and generally or partially conform to the inner surface 25 of the outer casing 2. The third chamber 13 can be separated from the first and second chambers 10, 12 by the third casing 17 which may have an ionically conductive partition 18 (similar to the partition 18 of FIG. 1). The ionically conductive partitions 18 can enable ions to transfer between the first and second electrode materials 28, 30 by way of the intervening electrolyte material 32 in the third casing 17. It can be beneficial to have the third chamber 13 dedicated to the electrolyte material 32 for improving safety by preventing and/or minimizing electrical shorts due to physical contact between the first and second electrode materials 28, 30 in the device because the third chamber 13 can provide more distance between the first and second chambers 10, 12.

Referring to FIG. 3C, the battery assembly 3 can include a plurality of first chambers 10, 10' and a plurality of second chambers 12, 12'. The first electrode materials 28, 28' can be disposed in the first chambers 10, 10' and the second electrode materials 30. 30' can be disposed in the second chambers 12, 12'. Unless otherwise noted, the components of FIG. 3C may be the same as or generally similar to like-numbered components of FIGS. 1-3B. Any pair of one of the plurality of first chambers 10, 10' and one of the plurality of second chamber 12, 12' adjacent to each other can act generally similar to the battery assembly 3 of FIG. 3A. FIG. 3C shows electrical connections between the first and second electrical terminals 27, 29 for the purpose of explanation. In some embodiments, these connections can be embedded in the outer casing 2 or via any external connections. A first battery cell 58 can be defined in part by the first chamber 10 with first electrode material 28 and the second chamber 12 with the second electrode material 30. A second battery cell 60 can be defined in part by the first chamber 10' with first electrode material 28' and the second chamber 12' with the second electrode material 30'. Such an arrangement can represent a parallel electrical connection between cells 58, 60. In the illustrated embodiment, the ionically conductive partition 18 can be disposed between the first and second cells 58, 60. In other embodiments, however, the partition or wall can comprise a non-conductive partition to electrically separate the first cell 58 from the second cell 60. The embodiment of FIG. 3C can provide the battery cells 58, 60 in parallel with one another, which can beneficially isolate malfunctioned chambers if there are any during operation. The malfunctioned chambers can be caused during manufacturing of the battery assembly 3. Physical impact during use of the battery assembly 3 can also cause the malfunctioned chambers. By connecting the battery cells 58, 60 in parallel, working cells can compensate for the malfunctioned chambers.

FIG. 3D is similar to the battery assembly 3 shown in FIG. 3C. However, instead of connecting the battery cells 58, 60 in parallel, the embodiment illustrated in FIG. 3D connects the cells 58, 60 in series. Because the cells 58, 60 are connected in series, instead of providing the ionically conductive partition 18 between the first and second cells 58, 60, a non-conductive partition can be provided between the cells 58, 60. The embodiments of FIG. 3D can provide benefits associated with serially connected batteries, such as increased voltage. In some embodiments, the battery assembly 3 of FIG. 3D can also be beneficial to increase flexibility and for precise volume control of the first and second chambers 10, 10', 12, 12'.

FIG. 3E shows a battery assembly 3 having differently sized first and second casings 14, 16. Unless otherwise noted, the components of FIG. 3E may be the same as or generally similar to like-numbered components of FIGS. 1-3D. In the illustrated embodiment, the first chamber 10 has a larger sectional area than the second chamber 12. In a three-dimensional configuration of this embodiment, the first chamber 10 can have larger volume than the second chamber 12. Thus, in some embodiments, there can be a greater volume of first electrode material 28 than the second electrode material 30 in the battery assembly 3 shown in FIG. 3E. The illustrated embodiment can be beneficial because it can allow for compensating different material properties for the first and second electrode materials 28, 30.

FIGS. 4A-4B illustrate another embodiment of a battery housing 1 and battery assembly 3 in which that battery housing 1 includes flexible or inflatable portions 43 and one or more relatively rigid portions 42. Unless otherwise noted, the components of FIGS. 4A-4B may be the same as or generally similar to like-numbered components of FIGS. 1-3D. FIG. 4A shows an embodiment of the battery housing 1 and the outer casing 2 before the first and second electrode materials 28, 30 are disposed into the first and second casings 14, 16 of the battery housing 1, according to another embodiment. FIG. 4B illustrates the battery assembly 3 after inflating the casings 14, 16 within the outer casing 2 by filling the casings 14, 16 with anode and cathode materials.

As noted above, the first and second casings 14, 16 of FIGS. 4A and 4B can have rigid portions 42 and flexible or inflatable portions 43 coupled with or connected to the rigid portions 42. In the illustrated embodiment, the rigid portion(s) 42 can be coupled with a wall 45 of the outer casing 2, and the flexible or inflatable portion(s) 43 can extend outwardly away from the wall 45. When the first and second electrode materials 28, 30 are injected into the inflatable or flexible portions 43 of the first and second casings 14, 16 can inflate or deform to the desired shapes, which may generally or partially conform to the inner surface of the outer casing 2, as explained above. By coupling the rigid portion 42 to the wall 45 of the casing 2, the expansion or inflatability of the flexible or inflatable portion(s) 43 can be directed in a desired direction, e.g., upwardly as shown in the embodiment of FIG. 4B. In other embodiments, however, it may be desirable to direct the inflation of the flexible or inflatable portion(s) 43 in other directions and to conform to other shapes. Such embodiments can be provided by having different flexibility or inflatability in different portions of the battery housing 1. In some embodiments, the rigid portions 42 can beneficially shield pressure sensitive areas in the outer casing 2. Moreover, in some embodiments, the rigid portion(s) 42 can beneficially comprise electronic components, such as electronic circuits, passive devices, etc., which can modify power levels and/or frequencies before transmission to the electronic device.

FIG. 4C is a schematic side sectional view of a battery assembly 3 in which the battery housing 1 comprises a bellows-like casing structure. Unless otherwise noted, the components of FIG. 4C may be the same as or generally similar to like-numbered components of FIGS. 1-4B. In FIG. 4C, the battery housing 1 and the outer casing 2 are shown prior to inflation, e.g., without the first and second electrode materials 28, 30 disposed into the first and second casings 14, 16 of the battery housing 1. In place of elastic materials, which may have a tendency to contract after filing, the illustrated casings can comprise relatively inelastic materials that are nevertheless expandable upon filling, similar to a mylar or foil balloon. In some embodiments, the apparatus shown in FIG. 4C can beneficially reduce the stress within the first and second casings 14, 16 because the bellow-like casing structure of the casings 14, 16 can compensate for the inflation when disposing the electrode materials 28, 30 by reducing a stretching amount of the casings 14, 16. In some embodiments, the embodiment shown in FIG. 4C can also beneficially direct the expansion and volume of inflation of the first and second casings 14, 16 in certain directions. For example, the embodiment illustrated in FIG. 4C can be suitable for vertical expansion of the casing 14, 16. However, in some embodiments, the casings 14, 16 can be designed to have properties that are suitable for horizontal expansion.

FIG. 5 shows another embodiment of the battery housing 1 having one or more electronic devices 36 integrated therein. Unless otherwise noted, the components of FIG. 5 may be the same as or generally similar to like-numbered components of FIGS. 1-4C. The electronic devices 36 can be disposed within a wall 47 of the battery housing 1. The wall 47 may be rigid or flexible in various embodiments. The electronic devices 36 can include any suitable types of electronic components, such as an integrated circuitry (e.g., analog-to-digital converter, an amplifier, other circuit components, etc.), a microelectromechanical systems device, a sensor device, etc. The electronic device 36 can be electrically connected to the electronic contacts 20, 22 via conductive wires, traces on a printed circuit board and/or any other suitable ways.

FIG. 6 shows another embodiment of the battery housing 1 and the outer casing 2, in which the inflatable inner casings 14, 16 are disposed around an electronic system 38. The electrical system 38 can include a plurality of electrical components. Unless otherwise noted, the components of FIG. 6 may be the same as or generally similar to like-numbered components of FIGS. 1-5. As shown in FIG. 6, the battery housing 1 can comprise a plurality of inflatable inner casings 14, 16 disposed about the periphery of the electronic system 38. An inner wall 37 of the battery housing 1 can separate the electrode materials 28, 30 from the electronic system 38, and can cause the battery housing 1 to generally conform around the electronic system 38. Thus, in some embodiments, the inner wall 37 of the housing 1 can define a hollow interior region configured to accommodate the system 38 therein. Conforming the battery housing 1 around the electronic system 38 can beneficially enable the battery assembly 3 to be integrated with the system 38 without significantly altering the shape and/or size of the system 38 by providing what effectively amounts to a layer of battery materials over the electronic system 38. In some embodiments, the inner wall 37 can comprise conductive contacts 20, 22 to provide electrical communication between the electrode materials 28, 30 and the electronic system 38. In addition, in the embodiment of FIG. 6, disposing the first and second casings 14, 16, around the electronic system 38 can beneficially protect the electronic system 38 from physical damages. As in FIGS. 3C and 3D, when different battery cells within the battery assembly 3 are connected in parallel, walls that separate each battery cell can comprise the ionically conductive partitions 18, in some embodiments. On the other hand, when the different battery cells within the battery assembly 3 are connected in series, the walls can include the non-conductive partitions 31. In some embodiments, conductive contacts 20, 22 and the first and second electrical terminals (not shown) can be provided for supplying electricity to another electronic system through an outer wall 39 of the housing 1.

Figure 7:
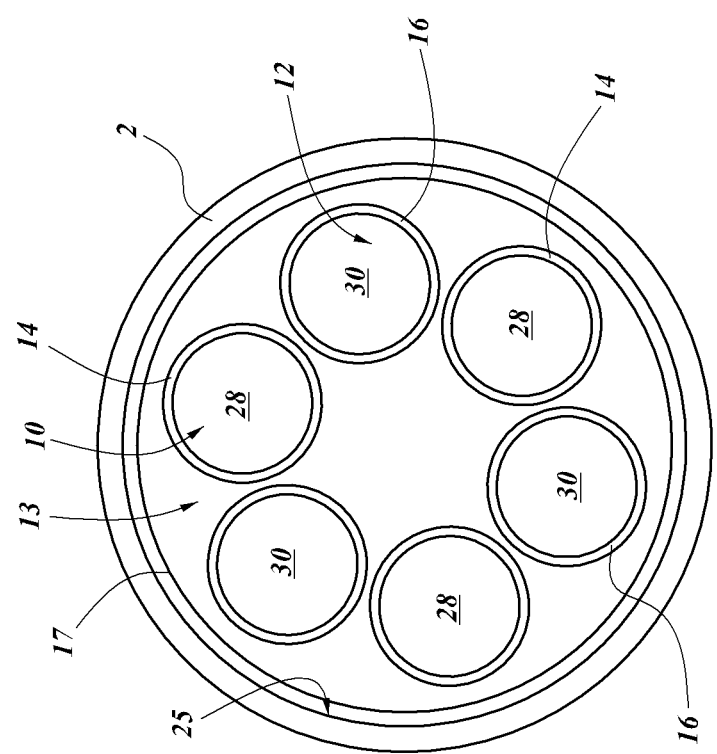
FIG. 7 is a schematic sectional end view of battery assembly defining a cable-like profile, according to various embodiments.

FIG. 7 is a schematic sectional end view of a battery assembly 3 that defines a cable-like profile, according to another embodiment. Unless otherwise noted, the components of FIG. 7 may be the same as or generally similar to like-numbered components of FIGS. 1-6. In the embodiment of FIG. 7, the battery assembly 3 can be shaped like a cable or wire, such that the battery assembly 3 may be elongated along a direction going into the page as shown in FIG. 7, e.g., elongated along a direction transverse to the walls of the casings 14, 16, 17. As with the embodiments described above, the inflatable inner casings 14, 16 can be inflatable, stretchable, flexible, and/or bendable to be able to freely deform within the outer casing 2. Furthermore, as with the embodiment of FIG. 3B, the battery housing 1 can comprise a third chamber 13 in which an electrolyte material 32 can be injected or otherwise provided. In the embodiment of FIG. 7, the electrolyte material 32 can be injected within the third chamber 13 to cause the third inflatable casing 17 to generally or partially conform to the shape of the inner surface 25 of the elongate outer casing 2. As explained above in connection with FIG. 3B, the electrolyte material 32 provided in the third chamber 13 can beneficially reduce the risk of shorting in various embodiments.

Figure 8A:
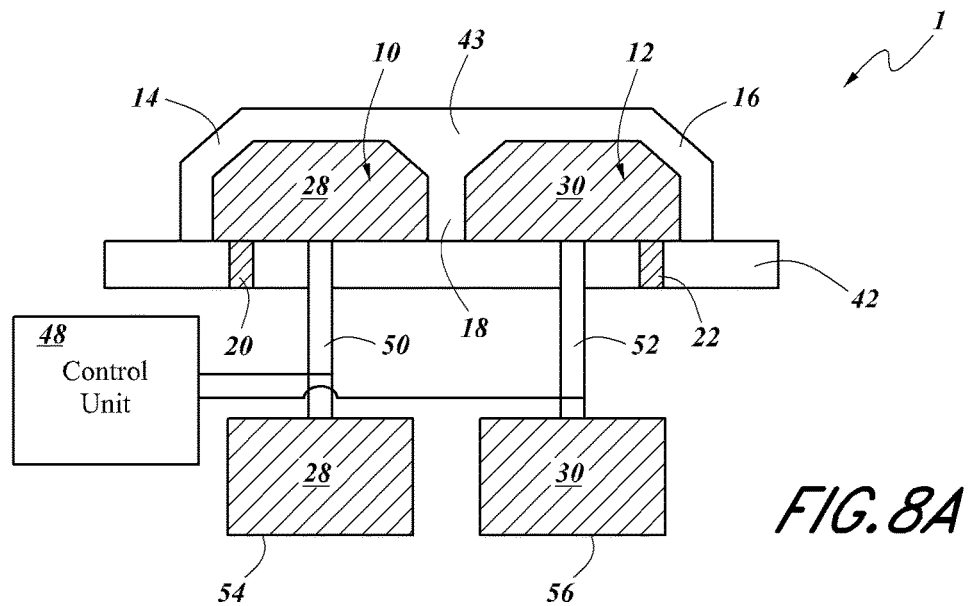
FIG. 8A is a cross sectional side view of the battery housing that includes a first reservoir and a second reservoir connected to corresponding first and second chambers via first and second feeders at a first state.
Figure 8B:
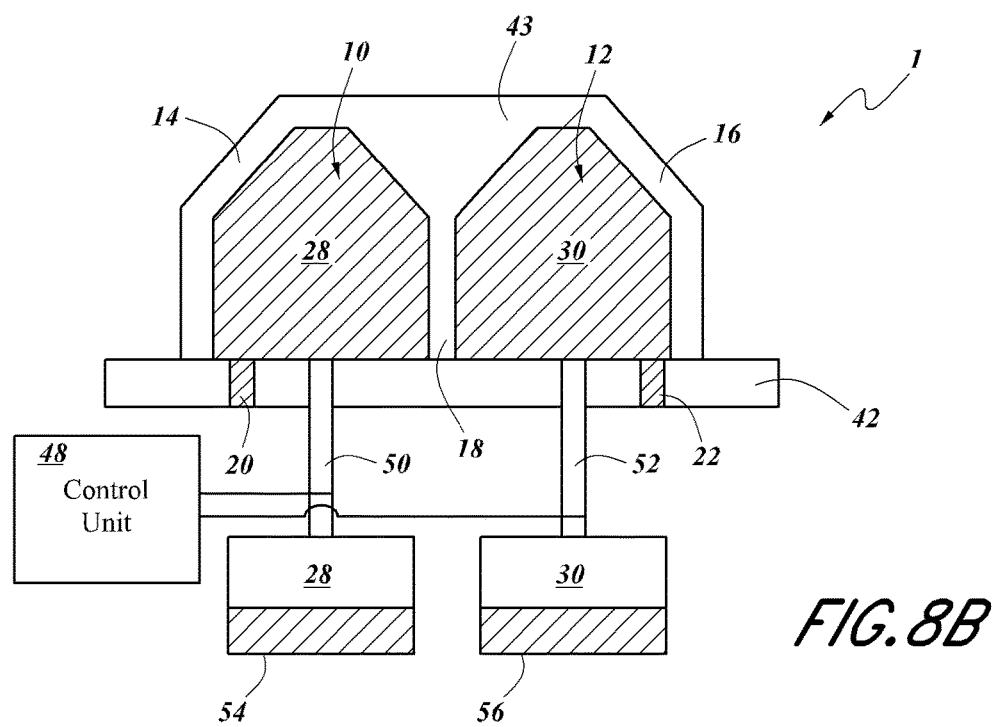
FIG. 8B is a cross sectional side view of the battery housing of FIG. 8A at a second state.

FIGS. 8A-8B illustrate another embodiment of a battery housing 1 that includes a first reservoir 54 and a second reservoir 56 connected to corresponding first and second chambers 10, 12 via first and second feeders 50, 52. The first reservoir 54 and the first chamber 10 can receive the first electrode material 28, and the second reservoir 56 and the second chamber 12 can receive the second electrode material 30. The electrode materials 28, 30 in the reservoir 54, 56 do not generate any current, therefore the materials can be considered inactive, as opposed to the electrode materials 28, 30 in the chambers 10, 12 which are electrically active. Unless otherwise noted, the components of FIGS. 8A-8B may be the same as or generally similar to like-numbered components of FIGS. 1-7. FIG. 8A shows an embodiment of the battery housing 1 at a first state and FIG. 8B shows the battery housing 1 at a second state. A control unit 48 can comprise memory and processing electronics configured to control the amount of electrode materials 28, 30 dispensed in the first and second chambers 10, 12 by moving the first electrode material 28 between the first chamber 10 and the first reservoir 54 via the first feeder 50 and moving the second electrode material 30 between the second chamber 12 and the second reservoir 56 via the second feeder 52, and vice versa. The control unit 48 can comprise pump(s) configured to drive the first and second electrode materials 28, 30 between the chambers 10, 12 and the reservoirs 54, 56. The processing electronics can be configured to control the operation of the pump(s), which may be driven by one or more motors. The first and second chambers 10, 12 shown in FIG. 8B have more electrode materials 28, 30 than the chambers 10, 12 shown in FIG. 8A. Thus, the battery cell at the second state (FIG. 8B) can have a higher capacity than the battery cell at the first state (FIG. 8A). Also, the battery cell at the second state (FIG. 8B) can be charged more quickly than the battery cell at the first state (FIG. 8A). In various embodiments, therefore, the volume of electrode materials 28, 30 in the chambers 10, 12 can be changed based on expected usage. For example, if the device is experiencing significant or peak usage, additional electrode materials 28, 30 can be pumped into the chambers 10, 12 to increase electrical charging capacity. On the other hand, if usage is low, then the amount of electrode materials 28, 30 can be reduced by pumping the electrode materials 28, 30 out of the respective chambers 10, 12, and the battery can be charged more quickly. In some embodiments, the first and second reservoirs 54, 56 can be within the first and second chambers 10, 12, or otherwise within the battery housing 1. In such embodiments, the first and second reservoirs 54, 56 can separate active first and second electrode materials 28, 30 from non-active first and second materials 28, 30 within the first and second chambers 10, 12.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:
1. A battery housing comprising:
a first chamber configured to receive a first electrode material, the first chamber bounded at least in part by a first inflatable casing;
a second chamber configured to receive a second electrode material, the second chamber bounded at least in part by a second casing;
an ionically conductive partition disposed between the first and second chambers;
a first electrical contact coupled to or formed with the first inflatable casing, the first electrical contact extending through a first wall of the first inflatable casing; and
a second electrical contact coupled to or formed with the second casing, the second electrical contact extending through a second wall of the second casing,
wherein the first inflatable casing is configured to inflate in response to an injection of the first electrode material into the first chamber.

2. The battery housing of claim 1, wherein the second casing is inflatable, the second casing is configured to inflate in response to an injection of the second electrode material into the second chamber.

3. The battery housing of claim 1, wherein the first electrode material comprises an anode material and the second electrode material comprises a cathode material.

4. The battery housing of claim 1, wherein the first inflatable casings comprise polyimide and the ionically conductive partition comprises Polyvinylidene Fluoride (PVDF).

5. The battery housing of claim 1, wherein the first inflatable casing and the second casing includes corresponding first and second current collectors.

6. The battery housing of claim 1, the ionically conductive partition comprises a third chamber, the third chamber configured to receive an electrolyte material.

7. The battery housing of claim 1, further comprising a first reservoir and a second reservoir configured to store inactive electrode materials therein.

8. The battery housing of claim 7, wherein amounts of the first electrode material and the second electrode material that are active and inactive are controlled by a control unit during use of the battery housing.

9. The battery housing of claim 1, further comprising a third chamber adjacent to and separated from the second chamber, and a fourth chamber adjacent to and separated from the third chamber by a third ionically conductive partition.

10. The battery housing of claim 9, wherein the third chamber is separated from the second chamber by a second ionically conductive partition or a non-conductive partition for a parallel connection.

11. The battery housing of claim 9, wherein the third inflatable casing is separated from the second chamber by the non-conductive partition for a serial connection.

12. The battery housing of claim 1, wherein the first inflatable casing remains inflatable after the injection of the first electrode material.

13. The battery housing of claim 1, wherein the first inflatable casing comprises a bellows-like shape.

14. The battery housing of claim 1, wherein the first inflatable casing has varying flexibility or inflatability such that the inflatable casing is configured to inflate in a predefined shape in response to the injection of the first electrode material into the first chamber.

15. A method for manufacturing a battery having a first chamber bounded at least in part by a first casing, a second chamber bounded at least in part by a second casing, an ionically conductive partition disposed between the first and second chambers, a first electrical contact coupled to or formed with the first casing, and a second electrical contact coupled to or formed with the second casing, wherein the first electrical contact extends through a first wall of the first casing and the second electrical contact extends through a second wall of the second casing, the method comprising:
 injecting a first electrode material into the first chamber to inflate the first chamber; and
 disposing a second electrode material into the second chamber.

16. The method of claim 15, wherein the injecting the first electrode material comprises injecting an anode material.

17. The method of claim 15, further comprising, before disposing the first electrode material and disposing the second electrode material, positioning the first and second chambers within an outer casing defined by an electronic device.

18. A battery assembly comprising:
 an outer casing; and
 a battery disposed in the outer casing, the battery comprising a battery housing comprising a first chamber and a second chamber separated by an ionically conductive partition, the first chamber bounded at least in part by a first inflated casing and the second chamber bounded at least in part by a second casing,
 wherein a first electrode material is disposed in the first chamber and a second electrode material is disposed in the second chamber,
 wherein a size and a shape of the first chamber is defined at least in part by a corresponding size and shape of the outer casing, and
 wherein the first inflated casing is configured to be inflated in response to an injection of the first electrode material into the first chamber.

19. The battery assembly of claim 18, further comprising first electrical contact coupled to or formed with the first inflated casing, the first electrical contact extending through a first wall of the first inflated casing to provide electrical communication with the first electrode material, and a second electrical contact coupled to or formed with the second casing, the second electrical contact extending through a second wall of the second casing to provide electrical communication with the second electrode material.

20. An electronic system comprising the battery assembly of claim 18, wherein the battery assembly is disposed about a periphery of the electronic system.

* * * * *